(12) United States Patent
Kozole et al.

(10) Patent No.: US 9,975,470 B2
(45) Date of Patent: May 22, 2018

(54) MOTOR VEHICLE ACCESSORY COMPONENT HAVING MODULAR LIGHT ASSEMBLY

(71) Applicant: JAC Products, Inc., Saline, MI (US)

(72) Inventors: Kevin W. Kozole, Troy, MI (US); Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 202 days.

(21) Appl. No.: 14/846,182

(22) Filed: Sep. 4, 2015

(65) Prior Publication Data

US 2016/0082879 A1    Mar. 24, 2016

Related U.S. Application Data

(60) Provisional application No. 62/052,679, filed on Sep. 19, 2014.

(51) Int. Cl.
| | |
|---|---|
| *F21V 29/00* | (2015.01) |
| *B60Q 1/00* | (2006.01) |
| *B60Q 1/32* | (2006.01) |
| *B60Q 1/26* | (2006.01) |

(52) U.S. Cl.
CPC .......... *B60Q 1/0088* (2013.01); *B60Q 1/2661* (2013.01); *B60Q 1/323* (2013.01)

(58) Field of Classification Search
CPC ..... B60Q 1/0088; B60Q 1/2661; B60Q 1/323
USPC ................................. 362/544, 506, 505, 519
See application file for complete search history.

(56) References Cited

U.S. PATENT DOCUMENTS

| | | |
|---|---|---|
| 3,887,803 A | 6/1975 | Savage, Jr. |
| 4,269,339 A | 5/1981 | Bott |
| 4,426,028 A | 1/1984 | Bott |
| 4,712,163 A | 12/1987 | Oxley |
| 4,722,030 A | 1/1988 | Bowden |
| 4,800,470 A | 1/1989 | Hartsaw |
| 5,066,889 A | 11/1991 | Edwards |
| 5,171,083 A | 12/1992 | Rich |
| 5,495,400 A | 2/1996 | Currie |
| 5,848,839 A | 12/1998 | Savage, Jr. |
| 6,069,447 A | 5/2000 | Vilanilam et al. |
| 6,114,954 A | 9/2000 | Palett et al. |
| 6,179,452 B1 * | 1/2001 | Dunning .......... F21S 4/20 362/223 |
| 6,550,414 B1 | 4/2003 | Correll et al. |
| 6,827,532 B1 | 12/2004 | Nix |

(Continued)

*Primary Examiner* — Anh Mai
*Assistant Examiner* — Glenn Zimmerman
(74) *Attorney, Agent, or Firm* — Harness, Dickey & Pierce, P.L.C.

(57) ABSTRACT

The present disclosure relates to a vehicle accessory component for a vehicle. The component makes use of a structural member having a channel. The structural member is attachable to the vehicle. A modular light assembly is included which has a frame and at least one optical element secured to the frame. Electrical cabling couples the optical element to a power source. The frame is insertable into the channel in the structural member and supported within the channel. The frame has at least one opening over which the optical element is positioned when the modular light assembly is inserted into the channel. This allows the optical element to provide illumination to an area adjacent the vehicle when the optical element is powered on.

18 Claims, 5 Drawing Sheets

(56) References Cited

U.S. PATENT DOCUMENTS

| | | | |
|---|---|---|---|
| 7,081,810 B2 | 7/2006 | Henderson et al. | |
| 7,377,674 B2 | 5/2008 | Klinkman et al. | |
| 7,549,773 B2 | 6/2009 | Lim | |
| 8,550,680 B2* | 10/2013 | Kim | F21S 2/005 362/217.01 |
| 8,985,414 B2 | 3/2015 | Aftanas | |
| 2005/0212249 A1 | 9/2005 | Lopez | |
| 2006/0220825 A1* | 10/2006 | Mertens | B60Q 1/20 340/479 |
| 2006/0291224 A1* | 12/2006 | England | B60Q 3/74 362/490 |
| 2008/0037266 A1* | 2/2008 | Cunnien | B60Q 1/323 362/495 |
| 2008/0123359 A1* | 5/2008 | Larochelle | B60Q 1/2696 362/501 |
| 2008/0253139 A1* | 10/2008 | Stokes | A62B 3/00 362/471 |
| 2009/0168441 A1* | 7/2009 | Lin | G02B 6/0081 362/487 |
| 2011/0317420 A1* | 12/2011 | Jeon | F21S 2/005 362/249.02 |
| 2012/0031939 A1* | 2/2012 | Jutila | B60Q 1/24 224/326 |
| 2013/0182428 A1* | 7/2013 | Seehof | F21V 21/14 362/220 |
| 2014/0291957 A1* | 10/2014 | Muhe-Sturm | A62C 27/00 280/163 |

* cited by examiner

MOTOR VEHICLE ACCESSORY COMPONENT HAVING MODULAR LIGHT ASSEMBLY

CROSS REFERENCE TO RELATED U.S. APPLICATIONS

The present application claims priority from U.S. provisional application Ser. No. 62/052,679, filed Sep. 19, 2014, the entire disclosure of which is hereby incorporated by reference into the present disclosure.

FIELD

The present disclosure relates to accessories for motor vehicles such as running boards, roof rack components and spoilers used with motor vehicles, and more particularly to an accessory component for a motor vehicle which has a modular light assembly that can be quickly and easily installed in the accessory component to provide a degree of lighting to areas which are adjacent the vehicle.

BACKGROUND

The statements in this section merely provide background information related to the present disclosure and may not constitute prior art.

Lighted vehicle accessory components are becoming increasingly popular with manufacturers of passenger cars and trucks. Such accessory components typically include lighted step rails used on minivans, vans, pickup trucks, SUVs and crossovers, as well other types of vehicles. Such lighting is often used to temporarily illuminate certain areas adjacent to the vehicle, for example the ground near the rocker panels of a passenger car, truck, SUV or van, to aid the vehicle operator in entering or exiting the vehicle, or to make the vehicle itself more visually conspicuous to other motorists during use of the vehicle. A popular present day use for such lighting is in connection with step rails used on passenger cars, trucks, SUVs, minivans, full size vans, and crossovers.

When incorporating lights into an external component of an accessory component of a motor vehicle, the complexity of assembly, cost and reliability become important considerations. Lights used on motor vehicle accessory components are exposed to the elements and therefore must be able to function reliably in conditions involving rain, snow and mud, as well as extreme hot and cold temperatures. This poses a challenge for designers to construct the accessory component so that the lighting elements and associated electrical wiring used to provide power to the lighting elements is integrated in such a way as to be protected from the elements.

Typically, present day lighting systems involve individual lights that are mounted to, or partially within, the accessory component. Such construction, while possibly providing adequate protection against the elements, can significantly complicate the assembly of the accessory component and/or its attachment to the vehicle during assembly of the vehicle. Attaching lights one by one, along with a wiring harness, to the accessory component such as by adhesives, mechanical fasteners or other means also requires a certain degree of skill, care and experience by the individual performing the installation. Such types of assembly can be challenging to perform when the installation of individual lighting components and associated electrical wiring needs to be done on a traditional vehicle assembly line. Individual lights that are not properly lined up with associated holes or openings in the accessory component during assembly can present areas where excessive water can enter an interior area of the accessory component and potentially compromise the operation of the lighting system. The requirement to have individual lights and associated wiring installed on the accessory component can also add to the overall cost of manufacture of the accessory component and/or the costs associated with installing it on a vehicle.

SUMMARY

In one aspect the present disclosure relates to a vehicle accessory component for a vehicle. The component makes use of a structural member having a channel. The structural member is attachable to the vehicle. A modular light assembly is included which has a frame and at least one optical element secured to the frame. Electrical cabling couples the optical element to a power source. The frame is insertable into the channel in the structural member and supported within the channel. The frame has at least one opening over which the optical element is positioned when the modular light assembly is inserted into the channel. This allows the optical element to provide illumination to an area adjacent the vehicle when the optical element is powered on. The present disclosure relates to a vehicle accessory component for a vehicle. The component makes use of a structural member having a channel. The structural member is attachable to the vehicle. A modular light assembly is included which has a frame and at least one optical element secured to the frame. Electrical cabling couples the optical element to a power source. The frame is insertable into the channel in the structural member and supported within the channel. The frame has at least one opening over which the optical element is positioned when the modular light assembly is inserted into the channel. This allows the optical element to provide illumination to an area adjacent the vehicle when the optical element is powered on.

In another aspect the present disclosure relates to a vehicle accessory component for a vehicle. The vehicle accessory component comprises a structural member having a channel which forms an elongated opening along an exterior surface of the structural member, and wherein the structural member is attachable to the vehicle. A modular light assembly is included which has a frame, a plurality of optical elements secured to the frame in spaced apart relationship to one another, and electrical cabling in communication with the optical elements. The electrical cabling enables the optical elements to be coupled to a power source and powered from the power source. The frame is insertable into the channel in the structural member and has a cross sectional shape which is similar to a cross sectional shape of the channel of the structural member. The frame includes a plurality of spaced apart holes over which the optical elements are positioned when the modular light assembly is inserted into the channel of the structural member. This allows the optical elements to provide illumination to an area adjacent the vehicle when the optical elements are powered on.

In still another aspect the present disclosure relates to a vehicle accessory component for a vehicle. The vehicle accessory component may comprise a structural member having an oval shape and a generally C-shaped channel which forms an elongated opening along an exterior surface of the structural member. The structural member is attachable to the vehicle by a plurality of brackets and forms a step rail to assist an operator in entering and exiting the vehicle.

A modular light assembly is included which has a generally U-shaped frame, a plurality of optical elements secured to the U-shaped frame in spaced apart relationship to one another, and electrical cabling in communication with the optical elements. The electrical cabling enables the optical elements to be coupled to a power source and to be supplied with power from the power source. The U-shaped frame is insertable into the C-shaped channel in the structural member and has a cross sectional shape which is similar to a cross sectional shape of the C-shaped channel of the structural member. The U-shaped frame includes a plurality of spaced apart holes over which the optical elements are positioned when the modular light assembly is inserted into the C-shaped channel of the structural member. This allows the optical elements to provide illumination to an area adjacent the vehicle when the optical elements are powered on.

BRIEF DESCRIPTION OF THE DRAWINGS

The drawings described herein are for illustration purposes only and are not intended to limit the scope of the present disclosure in any way.

DETAILED DESCRIPTION

Figure 1:
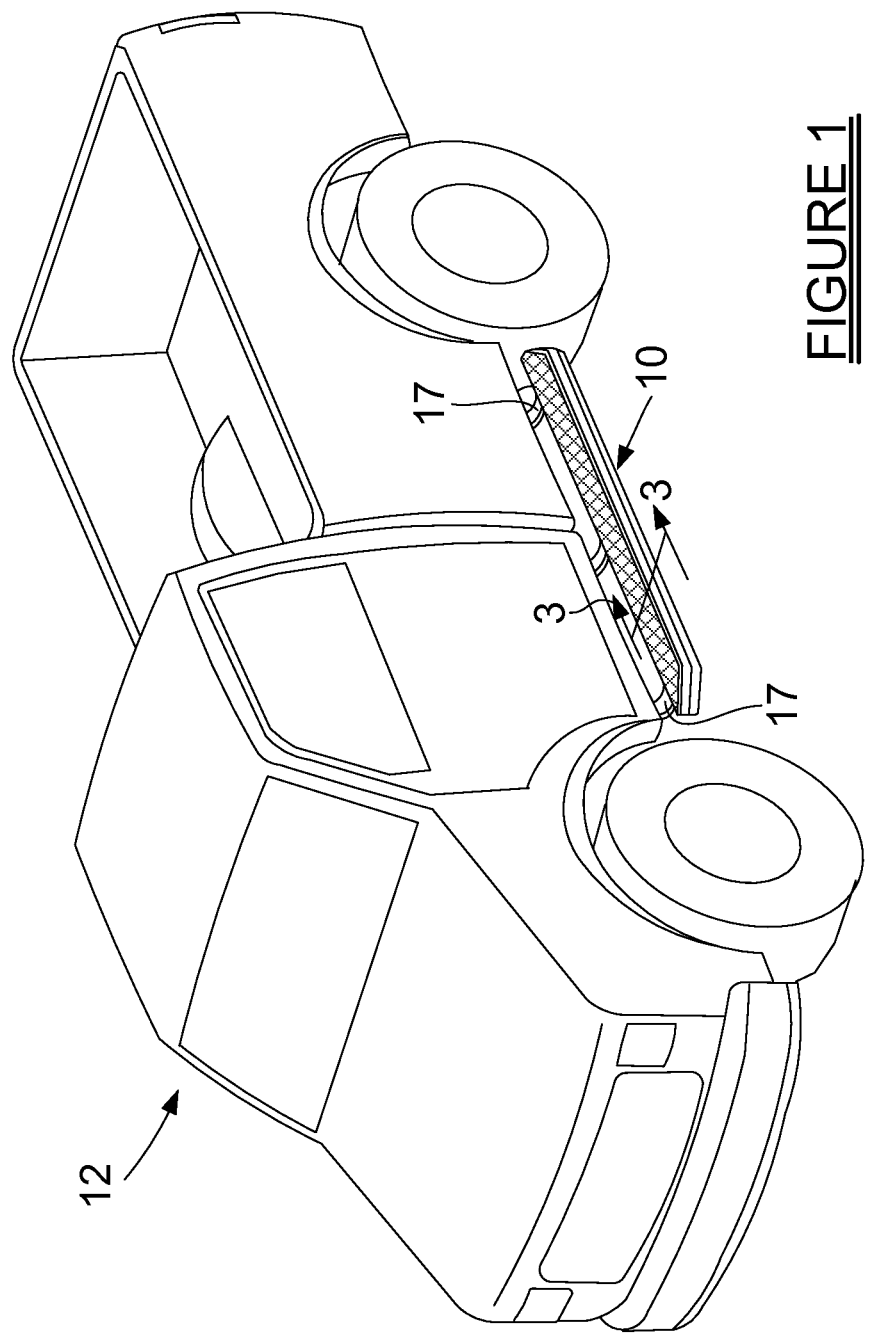
FIG. 1 is a perspective view of a pickup truck showing a step rail in accordance with one embodiment of the present disclosure mounted thereon.

The following description is merely exemplary in nature and is not intended to limit the present disclosure, application, or uses. It should be understood that throughout the drawings, corresponding reference numerals indicate like or corresponding parts and features.

Referring to FIG. 1, there is shown accessory component assembly 10 for use on a motor vehicle 12. In this example the accessory component 10 assembly is a step rail and the motor vehicle 12 is a pickup truck. Merely for convenience, the following discussion will reference the accessory component assembly as "step rail 10". In this example the step rail 10 provides a small degree of supplemental lighting 14 to areas adjacent the vehicle 12, and more specifically on the ground near the vehicle doors.

It will be appreciated immediately that the present teachings could be employed in connection with a wide variety of other forms of accessory components, for example and without limitation, side rails of roof rack systems, article supporting cross bars of roof rack systems, spoilers used on motor vehicles, and possibly even on front air dams, door mounted side rear view mirrors, vehicle rocker panels, etc. The present teachings are also not limited to use with pickup trucks but may be employed in connection with virtually any type of vehicle including SUVs, crossovers, minivans, full size vans, sedans, etc. The present teachings may also find utility in connection with recreational vehicles, campers, ATVs, boats and other marine vessels, snowmobiles, heavy duty earth moving equipment, etc. The present teachings may find utility in connection with any type of vehicle where it is desirable to provide some supplemental lighting to better help illuminate the vehicle or specific areas around the vehicle.

Figure 2:
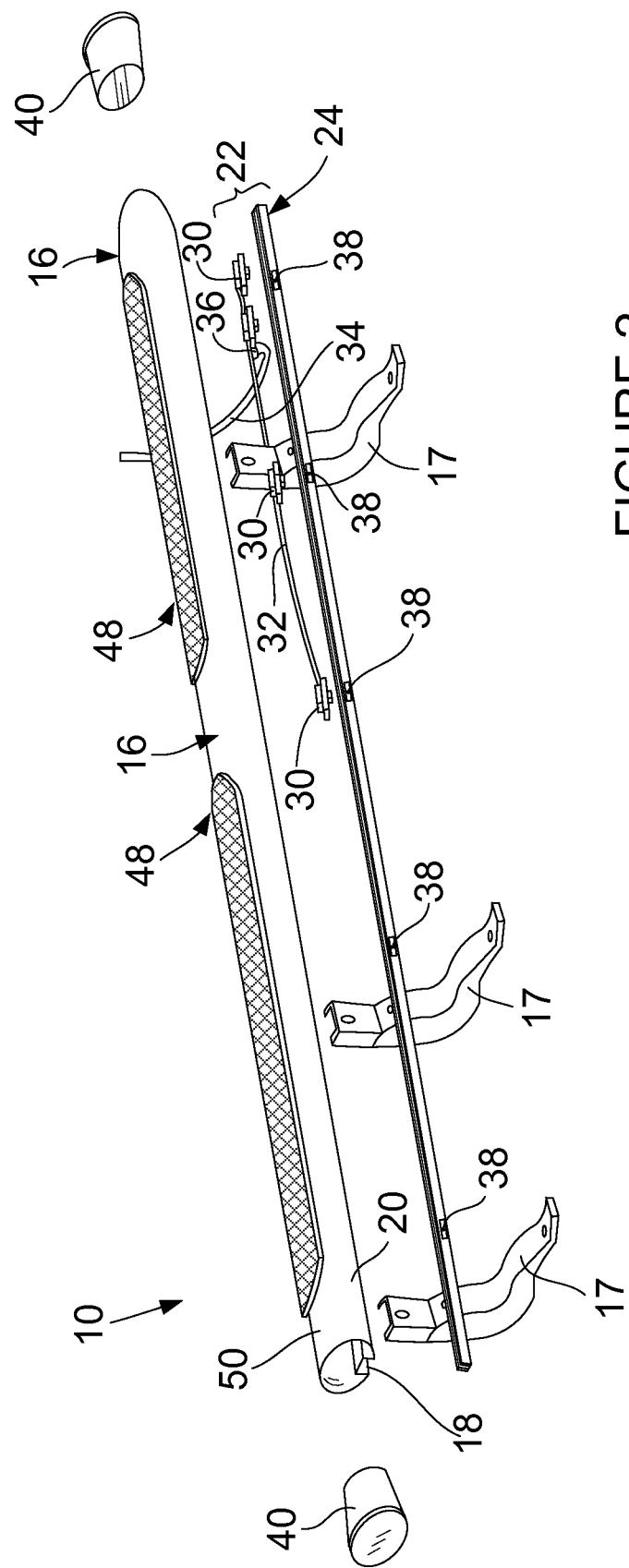
FIG. 2 is an exploded perspective view of the step rail of FIG. 1.

Referring to FIG. 2, the step rail 10 is shown in greater detail in exploded form. The step rail 10 may include a structural member 16 that may a single extruded, roll formed, or stamped metallic part which has a track or C-shaped channel 18 formed on an undersurface 20 thereof. The structural member 16 may be secured to a frame portion of the motor vehicle 12 by a plurality of conventional, suitable brackets 17 and conventional threaded fasteners (not shown) which position the structural member below the lower edge of the door of the motor vehicle 12. The precise cross sectional shape and/or configuration of the structural member 16 is not critical as long as it has the channel 18 or some form of elongated opening on its undersurface 20. Preferably the channel 18 extends along a major portion or the entire length of the structural member 16. The structural member 16 may be made from aluminum or any other material, possibly even high strength plastic, which is sufficiently strong to be used as a step rail on a vehicle.

Figure 3:
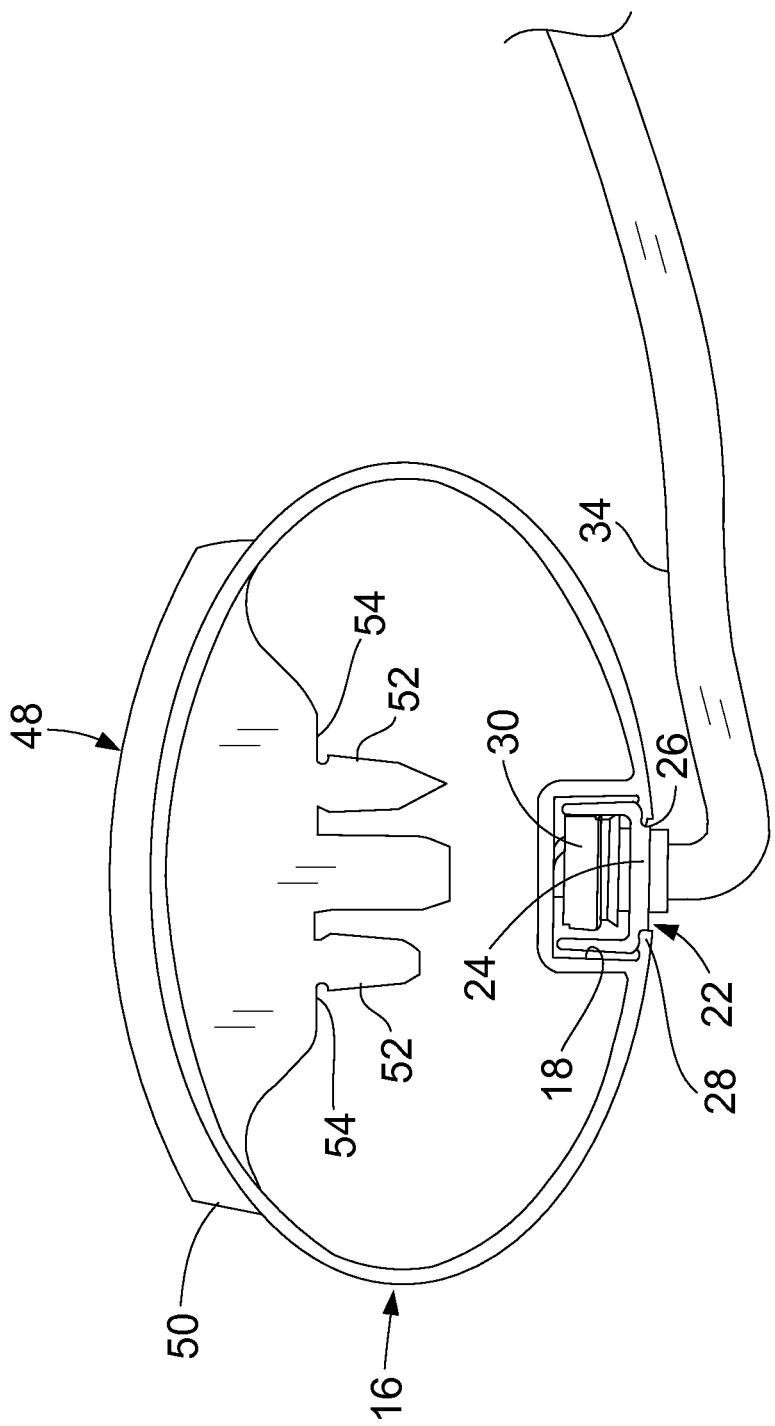
FIG. 3 is a cross sectional end view of the step rail taken in accordance with section line 3-3 in FIG. 1.

Referring to FIGS. 2 and 3, positioned within the channel 18 is a modular light assembly 22. The modular light assembly 22 may include a frame 24 having a pair of oppositely extending shoulders 26 of dimensions enabling the shoulders 26 to ride on ledges 28 of the channel 18. In this example, the engagement of the ledges 28 and the shoulders 26 enables the frame 24 to be slid into the channel 18 so that the modular light assembly 22 may be positioned at a desired position within the structural member 16.

Referring again to FIG. 2, the modular light assembly 22 may include a plurality of lights 30 spaced apart at predetermined positions by lengths of electrical cables 32. An additional length of electrical cable 34 is electrically coupled to a connector assembly 36 so that electrical power can be provided from the vehicle's electrical system to the lights 30 via the lengths of electrical cables 32. Electrical cables 32 and the electrical cable 34 cooperatively form a wiring harness that lies within the frame 24 when the modular light assembly 22 is assembled into the frame 24. The lights 30 may be wired in series or parallel, but preferably are wired in parallel.

The lights 30 are spaced apart so as to lay over associated openings or holes 38 in the frame 24 when the modular light assembly 22 is fully assembled. In this manner light from the lights 30 may project through the holes 38 and illuminate areas of a ground surface adjacent the rocker panel areas of the vehicle 12. Adhesives or other suitable fasteners may be used to hold the lights 30 directly over the holes 38.

Referring further to FIGS. 2 and 3, the step rail 10 may also include a pair of end caps 40 that close off the ends of the structural member 16 after the modular light assembly 22 is inserted into the channel 18. Optionally, one or more holes in the structural member 16 may be formed to permit an external electrical cable from the vehicle's 12 wiring harness to be coupled to the electrical cable 34 either within the interior area of the structural member 16, or otherwise at some other area outside of the structural member.

With further reference to FIG. 2, one or more sections of a rubber or like pad 48 may be secured to an upper surface 50 of the structural member 16 to provide a generally non-slip or reduced-slip surface which is comfortable to step on. The pad 48 may incorporate any suitable means for attachment to the structural member 16, but in this example a plurality of barbed, resilient plugs or tangs 52 are formed to project from a lower surface of the pad 48. The tangs 52 may be press fit into correspondingly positioned slots or openings 54 (FIG. 3) in the structural member 16, after which they are essentially non-removable or removable only by applying a high degree of force to the pad 48 to pull the tangs 52 from the openings 54.

Figure 4:
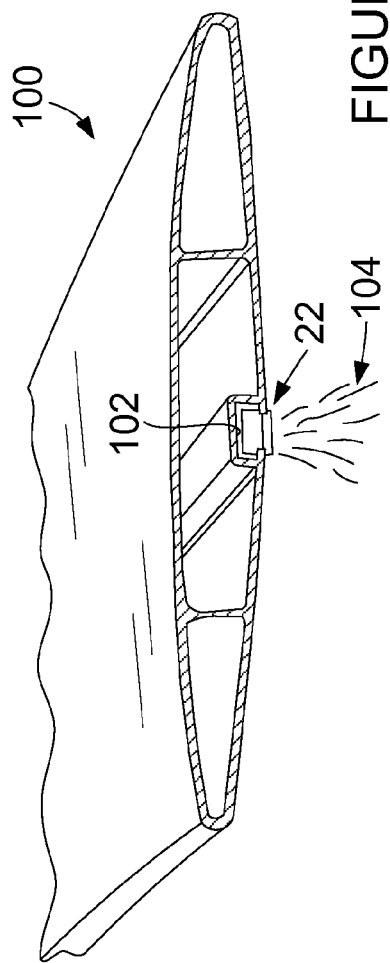
FIG. 4 is a cross sectional perspective end view of a cross bar of a vehicle roof rack which incorporates a modular light assembly of the present disclosure in a channel of the cross bar.

FIG. 4 shows a cross bar 100 of a vehicle roof rack (i.e., vehicle article carrier) system employing the modular light assembly 22 in a complementary shaped, downwardly opening, C-shaped channel 102. The cross bar 100 is typically employed to support articles thereon above a roof surface of the vehicle on which it is employed. Usually the cross bar 100 will be supported on a pair of support rails so as to extend perpendicularly above the vehicle roof between the support rails. If the cross bar 100 is formed with a slight curvature over its length, then the frame 24 of the modular light assembly 22 will typically require a corresponding curvature so that it can be inserted into the channel 102 without undue stress on the frame 24. Thus, the teachings herein may be used to allow a small degree of lighting 104 to be directed at the vehicle roof, which may provide an aesthetically pleasing appearance at night time as well as enhance visibility of the vehicle to other motorists during night time driving.

Figure 5:
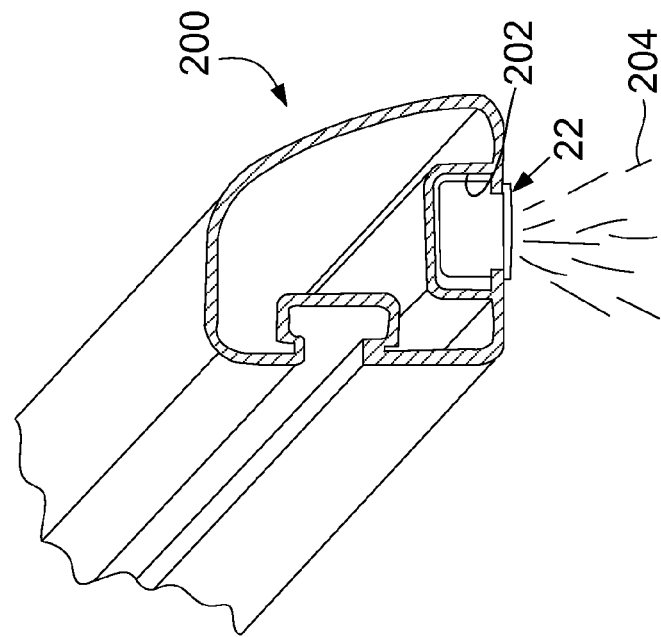
FIG. 5 is a cross sectional perspective end view of a support rail of a vehicle roof rack which incorporates a modular light assembly of the present disclosure in a channel of the support rail.

FIG. 5 shows one example of a support rail 200 incorporating the modular light assembly 22 in a downwardly opening, C-shaped channel 202 of the support rail 200. The support rail 200 may form part of a roof rack of a vehicle, and typically is attached to a roof surface of the vehicle to extend longitudinally along a major length of the roof surface. Again, if the support rail 200 is formed with a slight curvature over its length, then the frame 24 is preferably formed with a like curvature to enable easy insertion into the channel 202. This enables light 204 to be applied along side areas of the vehicle roof over which the support rail 200 is mounted.

Figure 6:
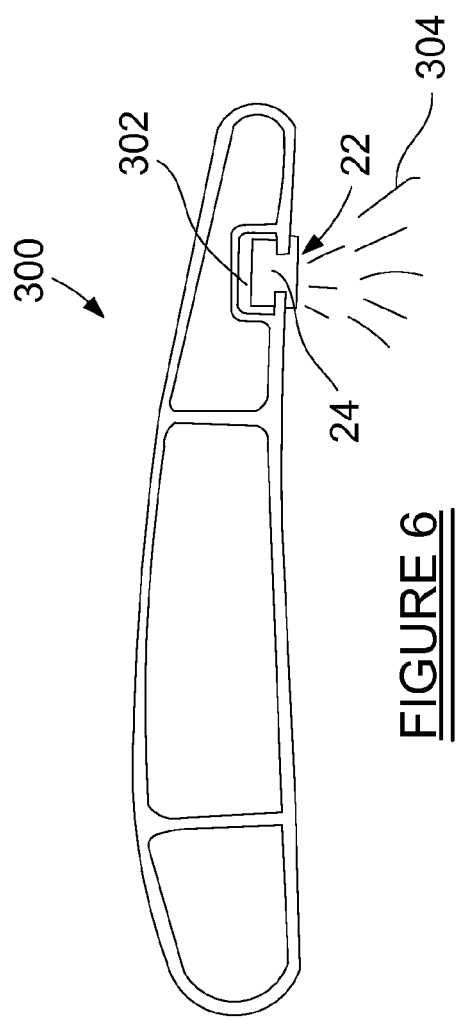
FIG. 6 is a cross sectional end view of a vehicle spoiler which incorporates a modular light assembly of the present disclosure in a channel of the spoiler.

FIG. 6 shows a spoiler 300 having a downwardly opening, C-shaped channel 302 formed therein in which the frame 24 of the modular light assembly is inserted. This allows light 304 to be provided to an area adjacent the rear bumper area of the vehicle.

Figure 7:
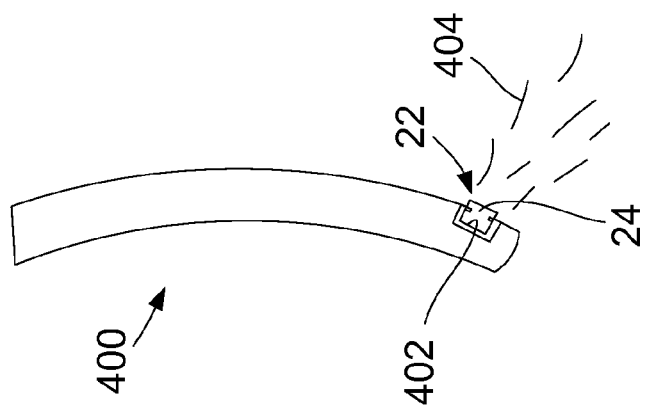
FIG. 7 is a cross sectional end view of a vehicle front air dam which incorporates a modular light assembly of the present disclosure in a channel of the air dam.

FIG. 7 shows a front air dam 400 for a vehicle having a rearwardly opening, C-shaped channel 402 in which the frame 24 of the modular light assembly 22 is positioned. This enables light 404 to be provided to a ground area under the front end of the vehicle.

While the foregoing embodiments have illustrated the modular light assembly 22 being slidably insertable into a correspondingly shaped channel, it is also possible that the modular light assembly may be fit into an elongated recess of the accessory component (e.g., step rail) and held therein by a flexible lip associated with the frame 24 which engages an inwardly projecting lip of the elongated recess. Another means of attachment may be through the use of conventional, external barbed or Christmas-like fasteners that engage within small holes in the structural member 16 of the step rail 10 once the modular light assembly 22 is fully inserted into the elongated recess. And while one long modular light assembly 22 is shown in FIGS. 2 and 3, it will be appreciated that a series of shorter, independent modular light assemblies could be used and interconnected by suitable electrical cabling and connectors. Such an embodiment may be desirable where the modular light assembly would need to bend around a sharp corner (e.g., 90 degree bend), but where the designer still wishes to provide the appearance of a generally continuous light source. As such, one skilled in the art will appreciate that there are numerous ways that the modular light assembly 22 could be configured and secured to the structural member 16 or to other accessory components often used on a vehicle. Thus, the use of a C-shaped channel (i.e., channel 18) is merely one way that attachment can be effected.

The step rail 10 with its modular light assembly 22 provide a number of important advantages over previously constructed step rails that have typically employed individual lights which are individually attached to the structural member portion of the step rail. For one, using a modular construction for the modular light assembly 22 allows assembly to be performed in a controlled environment, and thus helps to ensure a high level of quality control over the manufacturing process. This can help to better ensure that no small openings are left during the manufacturing process which could allow excessive water to enter into the interior areas directly around the lights where they project through the openings in the structural member, and potentially compromise the operability of the lights. The modular light assembly approach described herein also allows assembly to be performed even more quickly and without special assembly skills or special tools. This can potentially reduce the cost of the overall step rail.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle accessory component for a vehicle comprising:
    a rigid structural member having a channel extending along a full length thereof and forming an opening along an exterior surface thereof, the structural member being attachable to the vehicle to extend along a body surface area of the vehicle, the channel including a pair of inwardly projecting ledges and opposing ends;
    a support component for securing the structural member to the vehicle;
    a modular light assembly having a frame, at least one optical element secured to the frame, and electrical cabling in communication with the optical element and adapted to be coupled to a power source, to enable the optical element to be supplied with power from the power source, the frame having a cross sectional shape which is complementary to a cross sectional shape of the channel so that the frame of the modular light assembly is slidably insertable, as an entire subassembly, from at least one end of the structural member into the channel of the structural member and fully supported within the channel by the inwardly projecting ledges; and
    the frame including at least one opening aligned with the opening formed by the channel, over which the optical element is positioned when the modular light assembly is inserted into the channel of the structural member, to thus allow the optical element to provide illumination out through the opening in the channel to an area adjacent the vehicle when the optical element is powered on.

2. The vehicle accessory component of claim 1, wherein the channel of the structural member comprises a C-shaped channel, and the frame has a cross sectional shape which is complementary to the C-shaped channel.

3. The vehicle accessory component of claim 1, wherein the modular light assembly comprises a plurality of optical elements spaced apart along a length of the modular light assembly, and wherein the frame comprises a corresponding number of openings that enable the optical elements to each project an illumination beam therethrough when the optical elements are powered on.

4. The vehicle accessory component of claim 1, wherein the frame comprises a generally U-shape that is captured within the channel in the structural member when the modular light assembly is fully inserted within the channel.

5. The vehicle accessory component of claim 1, wherein the support component comprises a plurality of brackets for mounting the structural member to the vehicle.

6. The vehicle accessory component of claim 1, further comprising a pad secured to the structural member for providing a generally non-slip surface.

7. The vehicle accessory component of claim 1, wherein the vehicle accessory component comprises a step rail.

8. The vehicle accessory component of claim 1, wherein the vehicle accessory component comprises a support rail for a vehicle roof rack.

9. The vehicle accessory component of claim 1, wherein the vehicle accessory component comprises a cross bar for a vehicle roof rack.

10. The vehicle accessory component of claim 1, wherein the vehicle accessory component comprises at least one of a spoiler or an air dam for a motor vehicle.

11. The vehicle accessory component of claim 1, further comprising a pair of end caps configured to close off opposing ends of the structural member after the modular light assembly has been fully inserted into the channel.

12. The vehicle accessory component of claim 2, wherein the frame of the modular light assembly comprises a pair of oppositely extending shoulders that ride on the inwardly projecting ledges of the C-shaped channel.

13. A vehicle accessory component for a vehicle forming a load supporting element for supporting a load thereon, the vehicle accessory component comprising:
  a rigid structural member having a C-shaped channel which forms an elongated opening along an exterior surface of the structural member, the structural member being attachable to the vehicle and suitable for acting as a load bearing surface to support an external load thereon;
  a modular light assembly having a frame, a plurality of optical elements secured to the frame in spaced apart relationship to one another, and electrical cabling in communication with the optical elements for coupling the optical elements to a power source to be supplied with power from the power source, the frame having a cross sectional shape complementary to the C-shaped channel and being slidably insertable into the C-shaped channel in the structural member, from at least one end of the structural member, and retained therein by inwardly projecting ledges of the C-shaped channel; and
  the frame including a plurality of spaced apart holes over which the optical elements are positioned when the modular light assembly is slidably inserted into the channel of the structural member, to thus allow the optical elements to provide illumination out through the elongated opening in the C-shaped channel to an area adjacent the vehicle when the optical elements are powered on.

14. The vehicle accessory component of claim 13, wherein the frame comprises a generally U-shape when viewed in cross section, the frame having dimensions to fit nestably within the C-shaped channel when fully inserted into the C-shaped channel.

15. The vehicle accessory component of claim 13, further comprising a pair of end caps for closing off opposing ends of the structural member after the modular light assembly is slidably inserted in the structural member.

16. The vehicle accessory component of claim 13, wherein the vehicle accessory component forms at least one of:
  a step rail for the vehicle;
  a support rail for a vehicle article carrier;
  a cross bar for a vehicle article carrier;
  a spoiler for the vehicle; and
  an front air dam for the vehicle.

17. A vehicle accessory component for a vehicle comprising:
  a structural member having an oval shape and a generally C-shaped channel which forms an elongated opening along an exterior surface of the structural member, the structural member being attachable to the vehicle and forming a step rail to assist an operator in entering and exiting the vehicle;
  a plurality of brackets for attaching the structural member to the vehicle;
  a modular light assembly having a generally U-shaped frame, a plurality of optical elements secured to the U-shaped frame in spaced apart relationship to one another, and electrical cabling in communication with the optical elements and to enable the optical elements to be coupled to a power source, to enable the optical elements to be supplied with power from the power source, the U-shaped frame being insertable into the C-shaped channel in the structural member and having a similar cross sectional shape to a cross sectional shape of the C-shaped channel of the structural member; and
  the U-shaped frame including a plurality of spaced apart holes over which the optical elements are positioned when the modular light assembly is inserted into the C-shaped channel of the structural member, to thus allow the optical elements to provide illumination to an area adjacent the vehicle when the optical elements are powered on.

18. An accessory component for a vehicle comprising:
  a structural member having and a generally C-shaped channel which forms an elongated opening along an exterior surface of the structural member, the structural member being attachable to the vehicle and forming an elongated, rigid, rail-like component;
  at least one bracket for attaching the structural member to the vehicle;
  a modular light assembly having a generally U-shaped frame, a plurality of optical elements secured to the U-shaped frame in spaced apart relationship to one another, and electrical cabling in communication with the optical elements and to enable the optical elements to be coupled to a power source, to enable the optical elements to be supplied with power from the power source, the U-shaped frame being insertable into the C-shaped channel in the structural member and having a complementary shape to a cross sectional shape of the C-shaped channel of the structural member; the U-shaped frame retained therein by inwardly projecting ledges of the C-shaped channel; and the U-shaped frame including a plurality of spaced apart holes over which the optical elements are positioned when the modular light assembly is inserted into the C-shaped channel of the structural member, to thus allow the optical elements to provide illumination to an area adjacent the vehicle when the optical elements are powered on.

\* \* \* \* \*